United States Patent
Muranishi (10) Patent No.: US 11,958,139 B2
(45) Date of Patent: Apr. 16, 2024

(54) FLUX-CORED WIRE FOR GAS SHIELD ARC WELDING

(71) Applicant: Kobe Steel, Ltd., Kobe (JP)

(72) Inventor: Yoshimasa Muranishi, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 24 days.

(21) Appl. No.: 16/959,475

(22) PCT Filed: Jan. 16, 2019

(86) PCT No.: PCT/JP2019/001147
§ 371 (c)(1),
(2) Date: Jul. 1, 2020

(87) PCT Pub. No.: WO2019/142835
PCT Pub. Date: Jul. 25, 2019

(65) Prior Publication Data
US 2021/0069836 A1   Mar. 11, 2021

(30) Foreign Application Priority Data
Jan. 16, 2018 (JP) .................. 2018-005013

(51) Int. Cl.
*B23K 35/02* (2006.01)
*B23K 35/30* (2006.01)
(Continued)

(52) U.S. Cl.
CPC .......... *B23K 35/0266* (2013.01); *B23K 35/30* (2013.01); *B23K 35/3086* (2013.01);
(Continued)

(58) Field of Classification Search
None
See application file for complete search history.

(56) References Cited

U.S. PATENT DOCUMENTS

2002/0003135 A1* 1/2002 Goto .................. B23K 35/3053
219/145.22
2004/0020912 A1* 2/2004 Hara .................. B23K 35/3053
219/145.22
(Continued)

FOREIGN PATENT DOCUMENTS

CN  1314228 A   9/2001
EP  1769882 A1 * 4/2007 ............. B23K 35/36
(Continued)

OTHER PUBLICATIONS

International Search Report dated Apr. 2, 2019 in PCT/JP2019/001147 (with English translation), 3 pages.
(Continued)

*Primary Examiner* — Xiaobei Wang
(74) *Attorney, Agent, or Firm* — Oblon, McClelland, Maier & Neustadt, L.L.P.

(57) ABSTRACT

A flux-cored wire for gas shielded arc welding may contain, based on total mass of the wire: Fe: 78 mass % or more; $TiO_2$: 4 mass % to 13 mass %; Mn: 1.0 mass % to 2.4 mass %; Cr: 1.0 mass % to 3.0 mass %; Mo: 0.2 mass % to 1.2 mass %; Si: 0.1 mass % to 0.8 mass %; Mg: 0.1 mass % to 1.0 mass %; fluoride (F conversion value): 0.05 mass % to 0.25 mass %; C: 0.01 mass % to 0.10 mass %; V: 0.003 mass % to 0.020 mass %; Nb: 0.003 mass % to 0.020 mass %; and B: less than 100 ppm (including 0 ppm). The contents of Mn, C, and V based on total mass of the wire may satisfy a relationship of $28 \times Mn/(390 \times C + 2370 \times V) \geq 0.82$.

7 Claims, 2 Drawing Sheets

(51) Int. Cl.
- *B23K 35/368* (2006.01)
- *C22C 38/00* (2006.01)
- *C22C 38/02* (2006.01)
- *C22C 38/04* (2006.01)
- *C22C 38/18* (2006.01)
- *C22C 38/22* (2006.01)
- *C22C 38/24* (2006.01)
- *C22C 38/26* (2006.01)
- *C22C 38/32* (2006.01)

(52) U.S. Cl.
CPC ........ *B23K 35/3093* (2013.01); *B23K 35/368* (2013.01); *C22C 38/001* (2013.01); *C22C 38/002* (2013.01); *C22C 38/008* (2013.01); *C22C 38/02* (2013.01); *C22C 38/04* (2013.01); *C22C 38/22* (2013.01); *C22C 38/24* (2013.01); *C22C 38/26* (2013.01); *C22C 38/32* (2013.01); *C22C 38/18* (2013.01)

(56) References Cited

U.S. PATENT DOCUMENTS

| | | | | |
|---|---|---|---|---|
| 2015/0314397 | A1* | 11/2015 | Jeong | C22C 38/50 403/272 |
| 2019/0210165 | A1* | 7/2019 | Nako | B23K 35/3053 |

FOREIGN PATENT DOCUMENTS

| | | | |
|---|---|---|---|
| JP | 2614969 B2 | | 2/1997 |
| JP | 2004-58086 A | | 2/2004 |
| JP | 2018192520 A | * | 12/2018 |
| KR | 20070035996 | * | 4/2007 |
| KR | 20120060751 | * | 6/2012 |

OTHER PUBLICATIONS

Written Opinion of the International Searching Authority dated Apr. 2, 2019 in PCT/JP2019/001147 (with English translation), 7 pages.

\* cited by examiner

FLUX-CORED WIRE FOR GAS SHIELD ARC WELDING

TECHNICAL FIELD

The present invention relates to a flux-cored wire for gas shielded arc welding.

BACKGROUND ART

Examples of gas shielded arc welding wires include a solid wire and a flux-cored wire. The flux-cored wire has various advantages such as less spatter than the case of using a solid wire, a good bead appearance and a good bead shape, as well as good weldability not only in a downward position but also in a vertical and upward position. Therefore, application of the flux-cored wire is progressing in the field of low alloy heat resistant steel.

Since a welding structure in which low alloy heat resistant steel is used is used at high temperature and high pressure, a flux-cored wire for gas shielded arc welding for the low alloy heat resistant steel is required to have some characteristics necessary to be used in such a use environment. Further, a weld portion in the low alloy heat resistant steel is typically subjected to some post-weld heat treatment (heat treatment performed to soften a welded heat affected zone, improve toughness of the weld portion, and remove weld residual stress: hereinafter, referred to as PWHT) to remove weld residual stress and residual hydrogen in the weld portion and improve mechanical properties. Accordingly, there is a demand for a flux-cored wire for gas shielded arc welding for low alloy heat resistant steel, the flux-cored wire having a property of preventing performance deterioration of the weld portion associated with PWHT applied for achieving such an object.

However, in a case where a flux-cored wire for gas shielded arc welding for low alloy heat resistant steel in the related art is used, mechanical property may deteriorate when PWHT is performed at high temperature for a long time.

With respect to such a problem, for example, Patent Literature 1 discloses a flux-cored wire for gas shielded arc welding for low alloy heat resistant steel, the flux-cored wire being formed by filling a steel outer sheath with a flux, and containing: C: 0.20 mass % or less, Si: 0.06 mass % to 1.10 mass %, Mn: 0.55 mass % to 1.60 mass %, Cr: 2.60 mass % or less, Mo: 0.30 mass % to 1.50 mass %, Mg: 0.20 mass % to 1.50 mass %, N: 0.005 mass % to 0.035 mass %, and B: 0.001 mass % to 0.020 mass % based on total mass of the wire, $TiO_2$: 4.2 mass % to 8.2 mass % and a fluorine compound (a value converted to F): 0.025 mass % to 0.55 mass % based on total mass of the wire in the flux, and Al: 0.50 mass % or less, Nb: 0.015 mass % or less, and V: 0.015 mass % or less based on total mass of the wire.

CITATION LIST

Patent Literature

Patent Literature 1: JP-A-2004-058086

SUMMARY OF INVENTION

Technical Problem

However, the flux-cored wire disclosed in Patent Literature 1 contains 0.001 mass % to 0.020 mass % of B, and when PWHT is performed on weld metal obtained by using such a flux-cored wire, grain boundary cracks (called reheat cracks, SR (Stress Relief, stress relief annealing) cracks, or the like; hereinafter, referred to as SR cracks) may occur in the weld metal.

The present invention has been made in view of the above, and aims to provide a flux-cored wire excellent in weldability, by which a weld metal excellent in strength and toughness after PWHT and excellent in SR crack resistance can be obtained.

Solution to Problem

In order to solve the above problem, the present inventors have made intensive studies. As a result, it has been found that the problem can be solved as a result of the composition of the flux-cored wire satisfying specific conditions. The present invention has been made based on the finding.

That is, a flux-cored wire for gas shielded arc welding of the present embodiment, contains, based on total mass of the wire: Fe: 78 mass % or more; $TiO_2$: 4 mass % to 13 mass %; Mn: 1.0 mass % to 2.4 mass %; Cr: 1.0 mass % to 3.0 mass %; Mo: 0.2 mass % to 1.2 mass %; Si: 0.1 mass % to 0.8 mass %; Mg: 0.1 mass % to 1.0 mass %; fluoride (F conversion value): 0.05 mass % to 0.25 mass %; C: 0.01 mass % to 0.10 mass %; V: 0.003 mass % to 0.020 mass %; Nb: 0.003 mass % to 0.020 mass %; and B: less than 100 ppm (including 0 ppm), in which the contents of Mn, C, and V based on total mass of the wire satisfy a relationship of $28 \times Mn/(390 \times C + 2370 \times V) \geq 0.82$.

In the flux-cored wire for gas shielded arc welding, the contents of $TiO_2$, Mg, Nb, and V based on total mass of the wire may satisfy a relationship of $0.018 \times TiO_2 \times Mg + 2 \times (Nb+V) \leq 0.12$.

In the flux-cored wire for gas shielded arc welding, a content of at least one of P, S, and N based on total mass of the wire may be 0.02 mass % or less (including 0%).

In the flux-cored wire for gas shielded arc welding, a content of at least one of Na and K based on total mass of the wire may be 0.01 mass % to 0.20 mass %.

Advantageous Effects of Invention

According to the flux-cored wire of the present invention, a weld metal excellent in strength and toughness after PWHT and excellent in SR crack resistance can be obtained, and weldability is excellent.

DESCRIPTION OF EMBODIMENTS

Hereinafter, embodiments for carrying out the present invention will be described in detail. The present invention is not limited to the embodiments described below.

[Component Composition of Flux-Cored Wire]

Hereinafter, a reason for limiting the component composition of the flux-cored wire for gas shielded arc welding of the embodiment (hereinafter, also simply referred to as "wire") will be described. A content of the components of the wire of the present embodiment is a content based on total mass of the wire.

"$TiO_2$ Content: 4 Mass % to 13 Mass %"

$TiO_2$ is a main component of a slag forming agent and acts as an arc stabilizer. Further, in the case where the wire contains N, Ti generated by reducing part of $TiO_2$ by Si, Mn, Mg, and a fluoride combines with N to form TiN and the formed TiN is precipitated in the weld metal, and extremely effectively acts to prevent the formation of a ferrite band. $TiO_2$ is a main component of the slag forming agent, a reduction reaction of the part of $TiO_2$ is likely to be performed under a high temperature atmosphere in the arc, and the reduction reaction can be accelerated by containing $TiO_2$ in the flux. Therefore, $TiO_2$ is contained in the flux.

In the case where the $TiO_2$ content is too low, stability of the arc is impaired, the wire cannot be practically used from the standpoint of weldability, and an amount of Ti generated by reduction decreases, so that a precipitation amount of TiN also decreases, and an effect of preventing the formation of the ferrite band is insufficient. Therefore, the $TiO_2$ content is 4 mass % or more, preferably 4.5 mass % or more, more preferably 5.0 mass % or more.

On the other hand, in the case where the $TiO_2$ content is too high, viscosity of the slag is extremely large, which causes welding defects such as slag entrainment, an oxygen amount in the weld metal increases by slag entrainment, and toughness deteriorates. Therefore, the $TiO_2$ content is 13 mass % or less, preferably 12 mass % or less, more preferably 11 mass % or less.

"Mn Content: 1.0 Mass % to 2.4 Mass %"

Mn acts as a deoxidizing agent of the weld metal and has an effect of enhancing hardenability of the weld metal and improving tensile strength and toughness of the weld metal. Mn also has an effect of accelerating the reduction reaction of $TiO_2$. In order to obtain the effects, Mn is contained in either the steel outer sheath or the flux or both.

In the case where the Mn content is too low, a sufficient deoxidation effect cannot be obtained, a blowhole is likely to be generated, and sufficient tensile strength cannot be obtained. Furthermore, reduction of $TiO_2$ is insufficient, and an amount of TiN contributing to prevention of the formation of a ferrite band cannot be ensured. Therefore, the Mn content is 1.0 mass % or more, preferably 1.1 mass % or more, more preferably 1.2 mass % or more.

On the other hand, in the case where the Mn content is too high, fluidity of molten weld metal is excessively large, and the bead shape in a vertical and upward welding position significantly deteriorates. Further, the tensile strength of the weld metal is excessively large, a reduction amount of $TiO_2$ is excessive, an amount of Ti dissolved in solid increases, and toughness of the weld metal deteriorates. Therefore, the Mn content is 2.4 mass % or less, preferably 2.3 mass % or less, more preferably 2.2 mass % or less.

For achieving the above object, in the case where Mn is contained in the flux, a single metal or alloys such as metal Mn, Fe—Mn, or Fe—Si—Mn can be used. Here, in the present embodiment, the Mn content means a total element amount of Mn contained in the wire.

"Cr Content: 1.0 Mass % to 3.0 Mass %"

Cr is a main component of low alloy heat resistant steel and has an effect of improving the tensile strength of the weld metal. In order to obtain the effect, Cr is contained in either the steel outer sheath or the flux or both.

In the case where the Cr content is too low, the above effect cannot be sufficiently obtained. Therefore, the Cr content is 1.0 mass % or more, preferably 1.05 mass % or more, more preferably 1.10 mass % or more.

On the other hand, in the case where the Cr content is too high, the tensile strength excessively increases, and the toughness decreases. Therefore, the Cr content is 3.0 mass % or less, preferably 2.9 mass % or less, more preferably 2.8 mass % or less.

Here, in the present embodiment, the Cr content means a total element amount of Cr contained in the wire.

"Mo Content: 0.2 Mass % to 1.2 Mass %"

Like Cr, Mo is a main component of low alloy heat resistant steel and has an effect of improving the tensile strength of the weld metal. Mo has an effect of increasing temper softening resistance of the weld metal and preventing a decrease in tensile strength due to PWHT. In order to obtain the effects, Mo is contained in either the steel outer sheath or the flux or both.

In the case where the Mo content is too low, the above effect cannot be sufficiently obtained. Therefore, the Mo content is 0.2 mass % or more, preferably 0.25 mass % or more, more preferably 0.3 mass % or more.

On the other hand, in the case where the Mo content is too high, the tensile strength excessively increases, and the toughness decreases. Therefore, the Mo content is 1.2 mass % or less, preferably 1.15 mass % or less, more preferably 1.10 mass % or less.

Here, in the present embodiment, the Mo content means a total element amount of Mo contained in the wire.

"Si Content: 0.1 Mass % to 0.8 Mass %"

Si acts as a deoxidizing agent of the weld metal. Si has an effect of increasing viscosity of the weld metal and adjusting the bead shape. Further, Si has an effect of accelerating the reduction reaction of $TiO_2$. In order to obtain the effects, Si is contained in either the steel outer sheath or the flux or both.

In the case where the Si content is too low, a sufficient deoxidation effect cannot be obtained, a blowhole is likely to be generated, the viscosity of the weld metal is insufficient, and the bead shape deteriorates. Furthermore, reduction action of $TiO_2$ is insufficient, and an amount of TiN contributing to prevention of the formation of a ferrite band cannot be ensured. Therefore, the Si content is 0.1 mass % or more, preferably 0.2 mass % or more, more preferably 0.3 mass % or more.

On the other hand, in the case where the Si content is too high, the tensile strength is excessively large, a reduction amount of $TiO_2$ is excessive, an amount of Ti dissolved in solid increases, and toughness deteriorates. Therefore, the Si content is 0.8 mass % or less, preferably 0.75 mass % or less, more preferably 0.70 mass % or less.

In the case where Si is contained in the flux, Fe—Si, Fe—Si—Mn, Fe—Si—Cr, Si oxide, or the like can be used.

Here, in the present embodiment, the Si content means a total element amount of Si contained in the wire.

"Mg Content: 0.1 Mass % to 1.0 Mass %"

Mg acts as a strong deoxidizing agent of the weld metal and has an effect of improving toughness. In addition, like Si and Mn, Mg has an effect of accelerating the reduction reaction of $TiO_2$ and stabilizing yield of B into the weld metal. In order to obtain the effects, Mg is contained in either the steel outer sheath or the flux or both.

In the case where the Mg content is too low, a sufficient deoxidation effect cannot be obtained, a blowhole is likely to be generated, and the oxygen amount increases to decrease the toughness. Furthermore, reduction action of $TiO_2$ is insufficient, and an amount of TiN contributing to prevention of the formation of a ferrite band cannot be ensured. Therefore, the Mg content is 0.1 mass % or more, preferably 0.12 mass % or more, more preferably 0.14 mass % or more.

On the other hand, in the case where the Mg content is too high, a spatter generation amount increases, encapsulation of the slag is impaired, and the bead shape in the vertical and upward welding position deteriorates. Further, a reduction amount of $TiO_2$ is excessive, an amount of Ti dissolved in solid increases, and toughness deteriorates. Therefore, the Mg content is 1.0 mass % or less, preferably 0.9 mass % or less, more preferably 0.8 mass % or less.

As an Mg source, a single metal or alloys such as metal Mg, Si—Mg, or Ni—Mg can be used. Here, in the present embodiment, the Mg content means a total element amount of Mg contained in the wire.

"Fluoride Content (F Conversion Value): 0.05 Mass % to 0.25 Mass %"

Fluorides act as an arc stabilizer. Further, the fluorides have an effect of lowering a melting point of the molten slag, and have an effect of improving fluidity and encapsulation of the molten slag and adjusting the bead shape. Further, since fluorine gas dissociated and gasified in the arc accelerates stirring of molten metal, fluorides have effects of accelerating floating or separation of the slag from the molten metal and decreasing the oxygen amount in the weld metal. Further, like Si, Mn, and Mg described above, fluorides have an effect of preventing the formation of a ferrite band by precipitating TiN in the weld metal by the combination of N and Ti formed by accelerating reduction action of $TiO_2$. The fluorides are contained in the flux since the fluorides are a part of the slag forming agent, a reduction reaction of the part of $TiO_2$ is likely to be performed under a high temperature atmosphere in the arc, and the reduction reaction can be accelerated by containing fluorides in the flux.

In the case where the fluoride content is too low, the above effect cannot be obtained, stability of the arc is impaired, a spatter generation amount increases, and the bead shape deteriorates. In addition, the effect of decreasing the oxygen amount in the weld metal is insufficient, and a blowhole is likely to be generated. Furthermore, since reduction of $TiO_2$ is insufficient and an amount of Ti generated by reduction decreases, a precipitation amount of TiN also decreases, and an effect of preventing the formation of the ferrite band is insufficient. Therefore, in an F conversion value, the fluoride content is 0.05 mass % or more, preferably 0.07 mass % or more, more preferably 0.09 mass % or more.

On the other hand, in the case where the fluoride content in an F conversion value is too high, the fluidity of the slag is excessive, the encapsulation of the slag is impaired, and the bead shape significantly deteriorates. Therefore, in an F conversion value, the fluoride content is 0.25 mass % or less, preferably 0.23 mass % or less, more preferably 0.21 mass % or less.

LiF, NaF, $K_2SiF_6$, $CaF_2$, $MgF_2$, $BaF_2$, or $CeF_3$ or a fluorine oil containing $CF_2$ can be used as the fluorides. The fluorine oil containing $CF_2$ may be applied to a surface of the wire as a lubricant.

"C Content: 0.01 Mass % to 0.10 Mass %"

Since C has effects of improving the hardenability and increasing the tensile strength and toughness of the weld metal, C is contained in either the steel outer sheath or the flux or both.

In the case where the C content is too low, the above effects cannot be sufficiently obtained. Therefore, the C content is 0.01 mass % or more, preferably 0.02 mass % or more, more preferably 0.03 mass % or more.

On the other hand, in the case where the C content is too high, the tensile strength of the weld metal is excessively large, the toughness significantly decreases, and hot crack is caused. Therefore, the C content is 0.10 mass % or less, preferably 0.095 mass % or less, more preferably 0.090 mass % or less.

In the case where C is contained in the flux, a simple substance or alloys of C such as graphite, chromium carbide, Si—C, high C—Fe—Mn, or high C—Fe—Cr can be used.

"V: 0.003 Mass % to 0.020 Mass %"

V has effects of precipitating a carbide of V in the weld metal and preventing the formation of a ferrite band by preventing migration of C atoms in PWHT by the precipitate.

In the case where the V content is too low, the above effects cannot be sufficiently obtained. Therefore, the V content is 0.003 mass % or more, preferably 0.004 mass % or more, more preferably 0.005 mass % or more.

On the other hand, during PWHT, a needle-shaped fine carbide is formed by combining V with C, but in the case where the V content in the wire is excessive, the needle-shaped carbide causes the toughness of the weld metal to deteriorate significantly. Therefore, the V content is 0.020 mass % or less, preferably 0.019 mass % or less, more preferably 0.018 mass % or less.

"Nb: 0.003 Mass % to 0.020 Mass %"

Like V, Nb has effects of precipitating a carbide of Nb in the weld metal and preventing the formation of a ferrite band by preventing migration of C atoms in PWHT by the precipitate.

In the case where the Nb content is too low, the above effects cannot be sufficiently obtained. Therefore, the Nb content is 0.003 mass % or more, preferably 0.004 mass % or more, more preferably 0.005 mass % or more.

On the other hand, during PWHT, a needle-shaped fine carbide is formed by combining Nb with C, but in the case where the Nb content in the wire is excessive, the needle-shaped carbide causes the toughness of the weld metal to deteriorate significantly. Therefore, the Nb content is 0.020 mass % or less, preferably 0.019 mass % or less, more preferably 0.018 mass % or less.

"B Content: Less than 100 ppm (0.01%)"

In the case where the B content is excessive, not only the strength of the weld metal is too high to decrease the toughness, but also SR cracks are likely to occur in the weld metal. Therefore, the B content is less than 100 ppm, preferably less than 80 ppm, more preferably less than 60 ppm. The lower limit of the B content is not particularly limited, that is, the B content may be 0 ppm.

"Balance"

The main component of the flux-cored wire of the present embodiment is Fe. As Fe, Fe constituting the outer sheath, iron powder added to the flux, Fe of alloy powder, and the like are exemplified. Here, Fe is contained in a range of 78 mass % or more and 94 mass % or less. Fe is preferably contained in 80 mass % or more. Further, Fe is preferably contained in 92 mass % or less.

The flux-cored wire of the present embodiment contains Fe, $TiO_2$, Mn, Cr, Mo, Si, and Mg in a total amount of preferably 95 mass % or more, more preferably 98 mass % or more.

As the balance, inevitable impurities, a component selectively contained other than the above, O in the case where a component other than $TiO_2$ are contained as oxides in the flux, or the like may be included. Here, examples of the inevitable impurities include components other than the above-described components (such as Cu: 0.1 mass % or less, Al: 0.1 mass % or less, Zr: 0.1 mass % or less, Li: 0.1 mass % or less, Co: 0.1 mass % or less, Sn: 0.02 mass % or less, Sb: 0.02 mass % or less, and As: 0.02 mass % or less), and inevitably-contained components among the components which can be selectively added as described later, and it is acceptable to contain the inevitable impurities as long as the effects of the flux-cored wire according to the present embodiment are not diminished.

"28×Mn/(390×C+2370×V)≥0.82"

The flux-cored wire of the present embodiment satisfies 28×Mn/(390×C+2370×V)≥0.82. Here, Mn, C, and V respectively mean the contents of Mn, C, and V based on total mass of the wire. By controlling to increase the value of 28×Mn/(390×C+2370×V), generation of a ferrite side plate which is harmful to the toughness is prevented and a transformation temperature of the weld metal decreases and coarse bainite structures decrease, so that the toughness of the weld metal is improved.

Therefore, the value of 28×Mn/(390×C+2370×V) is 0.82 or more, preferably 0.84 or more, more preferably 0.86 or more. Here, it is practical that the value of 28×Mn/(390×C+2370×V) is 3.00 or less.

"0.018×$TiO_2$×Mg+2×(Nb+V)≤0.12"

The flux-cored wire of the present embodiment preferably satisfies 0.018×$TiO_2$×Mg+2×(Nb+V)≤0.12. Here, $TiO_2$, Mg, Nb, and V respectively mean the contents of $TiO_2$, Mg, Nb, and V based on total mass of the wire. By controlling to decrease a value of 0.018×$TiO_2$×Mg+2×(Nb+V), precipitation hardening in a grain during PWHT is prevented, and a difference in strength between an inner grain and a grain boundary decreases. Hereby, the occurrence of cracks can be prevented by releasing residual stress in welding in PWHT due to grain boundary sliding.

Therefore, the value of 0.018×$TiO_2$×Mg+2×(Nb+V) is preferably 0.12 or less, more preferably 0.11 or less, even more preferably 0.10 or less. Here, it is practical that the value of 0.018×$TiO_2$×Mg+2×(Nb+V) is 0.01 or more.

"P Content: 0.02 Mass % or Less"

P is a component contained as an impurity. By reducing the P content in the wire, the SR crack resistance of the obtained weld metal can be improved. Therefore, the P content is preferably 0.02 mass % or less, more preferably 0.018 mass % or less, still more preferably 0.016 mass % or less. The lower limit of the P content is not particularly limited, that is, the P content in the wire of the present embodiment may be 0%.

"S Content: 0.02 Mass % or Less"

Like P, S is also a component contained as an impurity. By reducing the P content in the wire, the SR crack resistance of the obtained weld metal can be improved. Therefore, the P content is preferably 0.02 mass % or less, more preferably 0.018 mass % or less, still more preferably 0.016 mass % or less. The lower limit of the S content is not particularly limited, that is, the S content in the wire of the present embodiment may be 0%.

"N Content: 0.02 Mass % or Less"

N has an effect of preventing the formation of a ferrite band in the weld metal by combining N with Ti to be precipitated as a nitride TiN. In addition, N has an effect of improving the toughness by fixing the Ti dissolved in solid as a nitride. In order to obtain the effect, N may be contained in either the steel outer sheath or the flux or both.

However, in the case where the N content is excessive, an amount of N dissolved in solid increases and the toughness deteriorates, and excessive N causes blowholes, and causes deterioration of slag removability. Therefore, the N content is preferably 0.02 mass % or less, more preferably 0.018 mass % or less, still more preferably 0.016 mass % or less.

In the case where N is contained in the flux, a metal nitride such as N—Cr, N—Si, or N—Ti can be used.

N may not be contained in the wire of the present embodiment, that is, the N content in the wire of the present embodiment may be 0%.

"Na Content: 0.01 Mass % to 0.20 Mass %"

Na can be contained in the wire of the present embodiment as an optional component.

Since Na has an effect of stabilizing the arc, the Na content is preferably 0.01 mass % or more, more preferably 0.012 mass % or more, still more preferably 0.014 mass % or more.

On the other hand, by reducing the Na content, molten metal reservoir stability can be improved. Therefore, the Na content is preferably 0.20 mass % or less, more preferably 0.19 mass % or less, still more preferably 0.18 mass % or less.

"K Content: 0.01 Mass % to 0.20 Mass %"

K can be contained in the wire of the present embodiment as an optional component.

Like Na, K has an effect of stabilizing the arc, and the K content is preferably 0.01 mass % or more, more preferably 0.012 mass % or more, still more preferably 0.014 mass % or more.

On the other hand, by reducing the K content, molten metal reservoir stability can be improved. Therefore, the K content is preferably 0.20 mass % or less, more preferably 0.19 mass % or less, still more preferably 0.18 mass % or less.

It is practical that Na and K are contained in the flux in a form of oxides such as $Na_2O$ and $K_2O$ or a form of fluorides.

Although a flux filling rate of the flux-cored wire of the present embodiment is not particularly specified, the flux filling rate can be appropriately set in consideration of wire productivity, for example, breaking of wire during molding and wiredrawing. The flux filling rate is preferably 11.0 mass % to 18.0 mass %, for example.

As a shielding gas used when welding is performed by using the flux-cored wire of the present embodiment, not only 100% $CO_2$ gas, but also a mixed gas of Ar gas and $CO_2$ gas, a mixed gas of Ar gas and $O_2$ gas, or a mixed gas of Ar gas, $CO_2$ gas, and $O_2$ gas can be used, and any composition thereof can be used. The steel outer sheath is preferably selected depending on component composition of a material to be welded, and mild steel or alloy steel can be used. A cross-sectional shape of the wire is not necessary to be particularly specified, and there may be a seam or not. In addition, in the case where a seam is absent in the cross-sectional shape of the wire, Cu plating or Ni plating or composite plating thereof can be applied to the wire surface.

EXAMPLES

Hereinafter, the effects of the present invention will be described in more detail with reference to Examples and Comparative Examples of the present invention, but the present invention is not limited thereto.

Figure 1A:
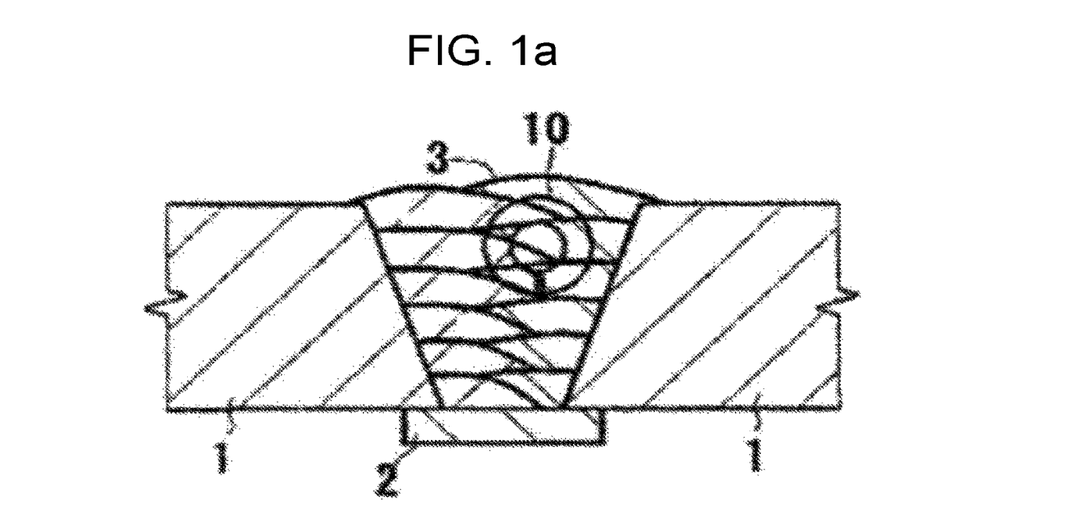
FIG. 1a is a sectional view showing a sampling position of a cylindrical test piece used for evaluation of SR crack resistance.

Flux-cored wires having a wire diameter of 1.2 mm containing wire components shown in Tables 1 and 2 were used, and a groove-shaped steel plate 1 made of Cr—Mo steel having a plate thickness of 20 mm shown in FIG. 1a, as a material to be welded, was butt-welded by gas shielded arc welding. The welding conditions are as shown below. The groove shape is a 450 V-shaped groove and has a root gap of 13 mm. The balance of the wire components shown in Tables 1 and 2 are Fe, inevitable impurities and so on, and F is an F conversion amount of fluorides. As Nb and V, analysis values of welding metal were used. The analysis values are considered equivalent to the values of Nb and V in the wire.

(Welding Conditions)
Welding current: 200 A to 300 A
Arc voltage: 25 V to 32 V
Kind of shielding gas: Ar-20% $CO_2$
Flow rate of shielding gas: 25 L/min
Preheating temperature and interpass temperature: 160° C. to 190° C.
Pass sequence: 6 layers and 12 passes

TABLE 1

| | Wire composition (mass %) | | | | | | | | | | | | | | | | |
|---|---|---|---|---|---|---|---|---|---|---|---|---|---|---|---|---|---|
| | $TiO_2$ | Mn | Cr | Mo | Si | Mg | F | C | V | Nb | B | P | S | N | Sn | Na | K |
| Example 1 | 12 | 1.9 | 1.3 | 0.4 | 0.4 | 0.2 | 0.12 | 0.07 | 0.006 | 0.011 | 0.0004 | 0.003 | 0.005 | 0.006 | 0.002 | 0.02 | 0.03 |
| Example 2 | 5 | 1.8 | 2.1 | 1.0 | 0.6 | 0.4 | 0.10 | 0.08 | 0.005 | 0.005 | 0.0004 | 0.002 | 0.006 | 0.003 | 0.004 | 0.02 | 0.03 |
| Example 3 | 6 | 2.3 | 1.4 | 0.5 | 0.4 | 0.2 | 0.14 | 0.06 | 0.006 | 0.006 | 0.0005 | 0.004 | 0.005 | 0.006 | 0.002 | 0.02 | 0.04 |
| Example 4 | 7 | 1.1 | 2.2 | 0.9 | 0.6 | 0.5 | 0.12 | 0.04 | 0.004 | 0.011 | 0.0008 | 0.002 | 0.008 | 0.003 | 0.004 | 0.02 | 0.03 |
| Example 5 | 6 | 1.9 | 2.8 | 1.0 | 0.6 | 0.3 | 0.10 | 0.07 | 0.008 | 0.008 | 0.0004 | 0.003 | 0.007 | 0.003 | 0.003 | 0.02 | 0.03 |
| Example 6 | 6 | 1.8 | 1.2 | 0.6 | 0.4 | 0.3 | 0.15 | 0.05 | 0.006 | 0.01 | 0.0006 | 0.004 | 0.005 | 0.006 | 0.002 | 0.02 | 0.03 |
| Example 7 | 7 | 2.0 | 2.3 | 1.1 | 0.4 | 0.2 | 0.12 | 0.07 | 0.007 | 0.007 | 0.0007 | 0.003 | 0.004 | 0.003 | 0.004 | 0.02 | 0.04 |
| Example 8 | 8 | 1.9 | 2.2 | 0.3 | 0.5 | 0.4 | 0.13 | 0.06 | 0.008 | 0.009 | 0.0004 | 0.004 | 0.005 | 0.004 | 0.003 | 0.02 | 0.03 |
| Example 9 | 6 | 1.8 | 2.3 | 1.1 | 0.7 | 0.2 | 0.12 | 0.05 | 0.006 | 0.005 | 0.0008 | 0.002 | 0.005 | 0.006 | 0.003 | 0.02 | 0.03 |
| Example 10 | 7 | 2.0 | 1.5 | 0.4 | 0.2 | 0.4 | 0.10 | 0.07 | 0.008 | 0.007 | 0.0003 | 0.003 | 0.007 | 0.003 | 0.002 | 0.02 | 0.03 |
| Example 11 | 6 | 1.9 | 1.6 | 0.6 | 0.6 | 0.9 | 0.12 | 0.05 | 0.005 | 0.008 | 0.0002 | 0.002 | 0.008 | 0.003 | 0.004 | 0.02 | 0.03 |
| Example 12 | 6 | 1.9 | 2.4 | 1.0 | 0.4 | 0.1 | 0.13 | 0.05 | 0.006 | 0.011 | 0.0004 | 0.003 | 0 005 | 0.006 | 0.005 | 0.02 | 0.04 |
| Example 13 | 7 | 2.0 | 2.4 | 0.9 | 0.5 | 0.4 | 0.24 | 0.07 | 0.007 | 0.005 | 0.0008 | 0.002 | 0.007 | 0.004 | 0.002 | 0.02 | 0.03 |
| Example 14 | 6 | 1.8 | 1.3 | 0.4 | 0.4 | 0.2 | 0.06 | 0.08 | 0.005 | 0.006 | 0.0005 | 0.003 | 0.006 | 0.006 | 0.004 | 0.02 | 0.03 |
| Example 15 | 6 | 2.1 | 1.4 | 0.6 | 0.6 | 0.5 | 0.15 | 0.09 | 0.006 | 0.007 | 0.0006 | 0.002 | 0.005 | 0.003 | 0.003 | 0.02 | 0.03 |
| Example 16 | 6 | 1.9 | 1.3 | 0.4 | 0.5 | 0.2 | 0.12 | 0.03 | 0.009 | 0.005 | 0.0004 | 0.003 | 0.003 | 0.004 | 0.002 | 0.02 | 0.03 |
| Example 17 | 7 | 2.3 | 2.4 | 0.9 | 0.4 | 0.2 | 0.13 | 0.04 | 0.017 | 0.007 | 0.0003 | 0.004 | 0.004 | 0.006 | 0.005 | 0.02 | 0.03 |
| Example 18 | 8 | 1.9 | 1.3 | 0.5 | 0.6 | 0.4 | 0.16 | 0.07 | 0.004 | 0.005 | 0.0007 | 0.003 | 0.005 | 0.005 | 0.004 | 0.02 | 0.04 |
| Example 19 | 6 | 2.0 | 2.4 | 1.0 | 0.4 | 0.2 | 0.12 | 0.05 | 0.005 | 0.019 | 0.0006 | 0.004 | 0.003 | 0.003 | 0.002 | 0.02 | 0.03 |
| Example 20 | 7 | 1.8 | 1.3 | 0.4 | 0.4 | 0.3 | 0.14 | 0.07 | 0.006 | 0.004 | 0.0005 | 0.003 | 0.005 | 0.006 | 0.005 | 0.02 | 0.03 |
| Example 21 | 7 | 1.7 | 2.5 | 1.1 | 0.5 | 0.2 | 0.12 | 0.06 | 0.007 | 0.007 | 0.009 | 0.003 | 0.005 | 0.004 | 0.005 | 0.02 | 0.03 |

| | 28 × Mn/(390 × C + 2370 × V) | 0.018 × $TiO_2$ × Mg + 2 × (Nb + V) |
|---|---|---|
| Example 1 | 1.28 | 0.08 |
| Example 2 | 1.17 | 0.06 |
| Example 3 | 1.71 | 0.05 |
| Example 4 | 1.23 | 0.09 |
| Example 5 | 1.15 | 0.06 |
| Example 6 | 1.49 | 0.06 |
| Example 7 | 1.28 | 0.05 |
| Example 8 | 1.26 | 0.09 |
| Example 9 | 1.49 | 0.04 |
| Example 10 | 1.21 | 0.08 |
| Example 11 | 1.70 | 0.12 |
| Example 12 | 1.58 | 0.04 |
| Example 13 | 1.28 | 0.07 |
| Example 14 | 1.17 | 0.04 |
| Example 15 | 1.19 | 0.08 |
| Example 16 | 1.61 | 0.05 |
| Example 17 | 1.15 | 0.07 |
| Example 18 | 1.45 | 0.08 |
| Example 19 | 1.79 | 0.07 |
| Example 20 | 1.21 | 0.06 |
| Example 21 | 1.19 | 0.05 |

TABLE 2

| | Wire composition (mass %) | | | | | | | | | | | | |
|---|---|---|---|---|---|---|---|---|---|---|---|---|---|
| | $TiO_2$ | Mn | Cr | Mo | Si | Mg | F | C | V | Nb | B | P | S |
| Comp. Example 1 | 14 | 2.0 | 1.4 | 0.4 | 0.5 | 0.5 | 0.16 | 0.05 | 0.005 | 0.011 | 0.0008 | 0.003 | 0.007 |
| Comp. Example 2 | 3 | 1.9 | 2.2 | 0.9 | 0.4 | 0.3 | 0.12 | 0.07 | 0.006 | 0.005 | 0.0007 | 0.002 | 0.004 |
| Comp. Example 3 | 6 | 2.6 | 1.3 | 0.5 | 0.6 | 0.2 | 0.16 | 0.06 | 0.01 | 0.009 | 0.0004 | 0.002 | 0.005 |
| Comp. Example 4 | 7 | 0.8 | 2.4 | 1.0 | 0.4 | 0.4 | 0.13 | 0.05 | 0.005 | 0.005 | 0.0008 | 0.003 | 0.006 |
| Comp. Example 5 | 6 | 1.8 | 3.2 | 0.9 | 0.5 | 0.3 | 0.17 | 0.07 | 0.006 | 0.006 | 0.0006 | 0.002 | 0.003 |
| Comp. Example 6 | 7 | 1.7 | 0.8 | 0.4 | 0.4 | 0.2 | 0.14 | 0.06 | 0.007 | 0.008 | 0.0004 | 0.003 | 0.005 |
| Comp. Example 7 | 5 | 1.9 | 2.5 | 1.3 | 0.6 | 0.5 | 0.15 | 0.05 | 0.005 | 0.011 | 0.0003 | 0.003 | 0.004 |

TABLE 2-continued

| | | | | | | | | | | | | | |
|---|---|---|---|---|---|---|---|---|---|---|---|---|---|
| Comp. Example 8 | 7 | 1.8 | 1.4 | 0.1 | 0.5 | 0.3 | 0.12 | 0.07 | 0.006 | 0.007 | 0.0004 | 0.004 | 0.005 |
| Comp. Example 9 | 6 | 2.0 | 2.4 | 1.0 | 0.9 | 0.2 | 0.16 | 0.06 | 0.008 | 0.006 | 0.0007 | 0.004 | 0.006 |
| Comp. Example 10 | 8 | 1.9 | 1.3 | 0.5 | 0.0 | 0.3 | 0.13 | 0.08 | 0.005 | 0.009 | 0.0004 | 0.003 | 0.007 |
| Comp. Example 11 | 7 | 1.8 | 2.2 | 0.9 | 0.5 | 1.1 | 0.12 | 0.05 | 0.006 | 0.01 | 0.0003 | 0.002 | 0.005 |
| Comp. Example 12 | 6 | 1.7 | 2.4 | 1.1 | 0.4 | 0.0 | 0.14 | 0.07 | 0.005 | 0.005 | 0.0002 | 0.003 | 0.003 |
| Comp. Example 13 | 7 | 1.9 | 1.4 | 0.4 | 0.6 | 0.5 | 0.28 | 0.06 | 0.009 | 0.006 | 0.0007 | 0.004 | 0.004 |
| Comp. Example 14 | 6 | 1.8 | 2.4 | 0.9 | 0.5 | 0.3 | 0.02 | 0.05 | 0.006 | 0.008 | 0.0002 | 0.003 | 0.005 |
| Comp. Example 15 | 6 | 1.7 | 1.3 | 0.5 | 0.4 | 0.2 | 0.15 | 0.12 | 0.005 | 0.011 | 0.0002 | 0.003 | 0.006 |
| Comp. Example 16 | 7 | 1.9 | 2.2 | 1.0 | 0.6 | 0.4 | 0.13 | 0 | 0.008 | 0.005 | 0.0003 | 0.002 | 0.003 |
| Comp. Example 17 | 9 | 2.0 | 1.3 | 0.6 | 0.5 | 0.5 | 0.12 | 0.06 | 0.023 | 0.009 | 0.0008 | 0.003 | 0.005 |
| Comp. Example 18 | 6 | 1.8 | 2.4 | 0.9 | 0.6 | 0.2 | 0.15 | 0.07 | 0.001 | 0.007 | 0.0004 | 0.004 | 0.004 |
| Comp. Example 19 | 9 | 1.7 | 1.4 | 0.4 | 0.4 | 0.4 | 0.13 | 0.05 | 0.009 | 0.022 | 0.0007 | 0.003 | 0.003 |
| Comp. Example 20 | 6 | 1.8 | 1.3 | 0.5 | 0.5 | 0.3 | 0.15 | 0.06 | 0.008 | 0.001 | 0.0006 | 0.002 | 0.005 |
| Comp. Example 21 | 8 | 1.7 | 2.4 | 1.1 | 0.4 | 0.2 | 0.12 | 0.07 | 0.006 | 0.011 | 0.011 | 0.004 | 0.006 |
| Comp. Example 22 | 8 | 1.6 | 1.3 | 0.5 | 0.4 | 0.4 | 0.14 | 0.07 | 0.012 | 0.01 | 0.0006 | 0.004 | 0.003 |

| | Wire composition (mass %) | | | | $28 \times Mn/(390 \times C + 2370 \times V)$ | $0.018 \times TiO_2 \times Mg + 2 \times (Nb + V)$ |
|---|---|---|---|---|---|---|
| | N | Sn | Na | K | | |
| Comp. Example 1 | 0.005 | 0.002 | 0.02 | 0.03 | 1.79 | 0.16 |
| Comp. Example 2 | 0.006 | 0.003 | 0.02 | 0.05 | 1.28 | 0.04 |
| Comp. Example 3 | 0.003 | 0.005 | 0.02 | 0.03 | 1.55 | 0.06 |
| Comp. Example 4 | 0.005 | 0.002 | 0.02 | 0.04 | 0.71 | 0.07 |
| Comp. Example 5 | 0.006 | 0.003 | 0.02 | 0.03 | 1.21 | 0.06 |
| Comp. Example 6 | 0.004 | 0.002 | 0.02 | 0.05 | 1.19 | 0.06 |
| Comp. Example 7 | 0.003 | 0.004 | 0.02 | 0.03 | 1.70 | 0.08 |
| Comp. Example 8 | 0.003 | 0.002 | 0.02 | 0.04 | 1.21 | 0.06 |
| Comp. Example 9 | 0.004 | 0.004 | 0.02 | 0.03 | 1.32 | 0.05 |
| Comp. Example 10 | 0.003 | 0.003 | 0.02 | 0.03 | 1.24 | 0.07 |
| Comp. Example 11 | 0.006 | 0.002 | 0.02 | 0.03 | 1.49 | 0.17 |
| Comp. Example 12 | 0.003 | 0.005 | 0.02 | 0.03 | 1.22 | 0.02 |
| Comp. Example 13 | 0.005 | 0.003 | 0.02 | 0.04 | 1.19 | 0.09 |
| Comp. Example 14 | 0.004 | 0.002 | 0.02 | 0.03 | 1.49 | 0.06 |
| Comp. Example 15 | 0.006 | 0.003 | 0.02 | 0.03 | 0.81 | 0.05 |
| Comp. Example 16 | 0.005 | 0.003 | 0.02 | 0.03 | 2.81 | 0.08 |
| Comp. Example 17 | 0.004 | 0.002 | 0.02 | 0.04 | 0.72 | 0.15 |
| Comp. Example 18 | 0.006 | 0.003 | 0.02 | 0.03 | 1.70 | 0.04 |
| Comp. Example 19 | 0.003 | 0.005 | 0.02 | 0.03 | 1.17 | 0.13 |
| Comp. Example 20 | 0.004 | 0.002 | 0.02 | 0.03 | 1.19 | 0.05 |
| Comp. Example 21 | 0.006 | 0.005 | 0.02 | 0.03 | 1.15 | 0.06 |
| Comp. Example 22 | 0.004 | 0.003 | 0.02 | 0.03 | 0.80 | 0.10 |

The flux-cored wires of Examples and Comparative Examples were evaluated as follows. Evaluation results are shown in Tables 3 and 4.

(Evaluation of Weldability)

In addition to the above weld metal production, vertical fillet welding was performed, and an evaluation test of weldability was performed by using the flux-cored wires of Examples 1 to 21 and Comparative Examples 1 to 22. The evaluation of weldability was performed by function evaluation of stability of the arc during welding, slag removability, a spatter generation amount, and a bead shape. Flux-cored wires having comprehensively excellent weldability were evaluated as "Pass: Good", and others were evaluated as "Fail: Bad".

(Evaluation of Weld Metal Strength)

The obtained weld metal was subjected to PWHT at 675° C. to 705° C. for 1 hour, and then tensile strength, 0.2% proof stress, and elongation were measured by a tensile test.

Wires having a Cr content of less than 2.0% in which 0.2% proof stress is 468 MPa or more, tensile strength is within a range of 551 MPa to 689 MPa, and elongation is 19% or more were evaluated as "Pass: Good", and others were evaluated as "Fail: Bad".

Wires having a Cr content of 2.0% or more in which 0.2% proof stress is 537 MPa or more, tensile strength is within a range of 620 MPa to 758 MPa, and elongation is 19% or more were evaluated as "Pass: Good", and others were evaluated as "Fail: Bad".

(Evaluation of Toughness of Weld Metal)

The obtained weld metal was subjected to PWHT at 675° C. to 705° C. for 1 hour, and then a Charpy impact test was performed. Absorbed energy at 20° C. of a No. 4 Charpy test piece having a 2 mm V notch was measured at N=3. Wires in which the average value of absorbed energy was 27 J or more were evaluated as "Pass: Good", and others were evaluated as "Fail: Bad".

(SR Crack Resistance)

The obtained weld metal was not subjected to PWHT, a cylindrical test piece was sampled, and a ring crack test was performed to evaluate SR crack resistance.

Figure 1B:
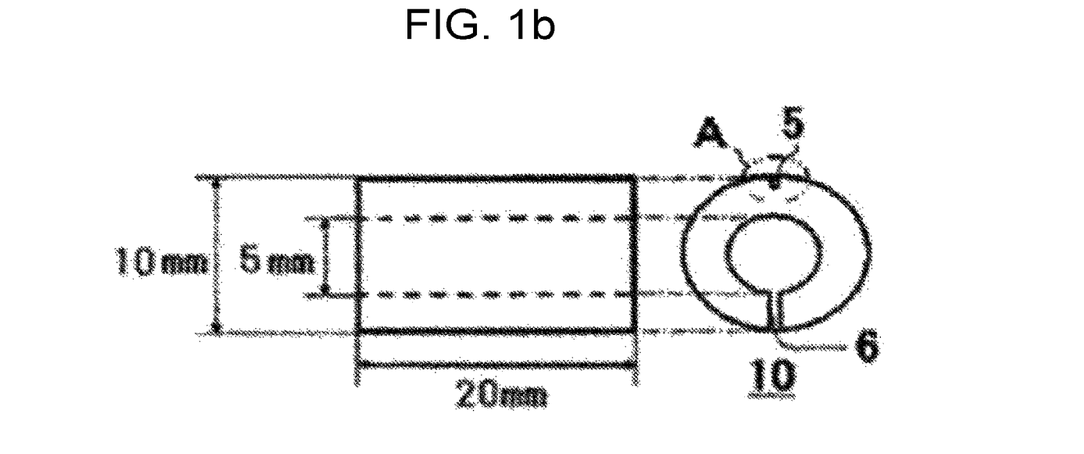
FIG. 1b is a sectional view showing a shape of the cylindrical test piece used for evaluation of SR crack resistance.
Figure 1C:
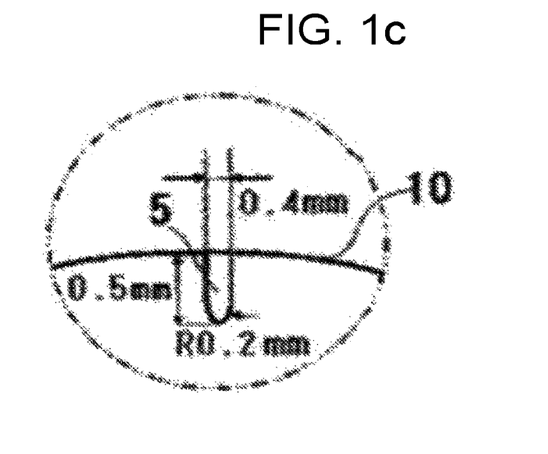
FIG. 1c is a view for explaining the cylindrical test piece of FIG. 1a and FIG. 1b.

First, as shown in FIG. 1a, a cylindrical test piece 10 shown in FIG. 1b was sampled from above final beads of weld metal 3. Details of the cylindrical test piece 10 are as shown in FIG. 1c, the cylindrical test piece 10 has a U notch 5 and a slit 6 leading to a cave inside the cylinder, and the U notch 5 is located above an as-cast portion of the weld metal 3, and a slit 6 is located below the as-cast portion of the weld metal 3. The U notch 5 is a U-shaped groove having a depth of 0.5 mm, a width of 0.4 mm, and a curvature radius of the bottom of 0.2 mm. The slit 6 is formed in a width of 0.5 mm.

Figure 1D:
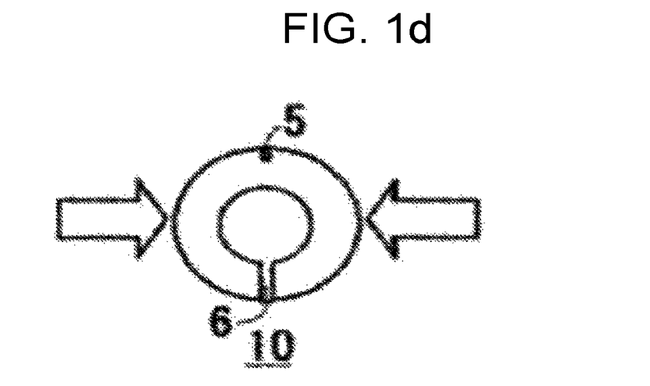
FIG. 1d is a sectional view showing a ring crack test using the cylindrical test piece.

Next, the obtained cylindrical test piece 10 was used to perform a ring crack test with reference to "study on stress relief annealing crack (second report)" (Uchiki et al, Journal of the Japan Welding Society: Vol. 33, No. 9 (1964) P. 718). In detail, as shown in FIG. 1d, in a state where bending stress was applied to the cylindrical test piece 10 in a direction indicated by arrows, the slit 6 of the test piece 10 was TIG-welded without using filler metal, and a PWHT treatment same as the above was performed in a state where tensile residual stress was applied to the U notch 5. After PWHT, optical microscope observation (magnification: 100 times) was performed on three cross sections of the ring, and in the case where no crack was recognized from the bottom of the U notch 5 in any cross section, it was evaluated as "Pass: Good" that occurrence of SR cracks was prevented (SR crack resistance is excellent); in the case where a crack was recognized in any one of the three cross sections, it was evaluated as "Fail: Bad" that the SR cracks occurred (SR crack resistance is poor).

TABLE 3

|  | Weldability | Strength | Toughness | SR crack resistance |
| --- | --- | --- | --- | --- |
| Example 1 | Good | Good | Good | Good |
| Example 2 | Good | Good | Good | Good |
| Example 3 | Good | Good | Good | Good |
| Example 4 | Good | Good | Good | Good |
| Example 5 | Good | Good | Good | Good |
| Example 6 | Good | Good | Good | Good |
| Example 7 | Good | Good | Good | Good |
| Example 8 | Good | Good | Good | Good |
| Example 9 | Good | Good | Good | Good |
| Example 10 | Good | Good | Good | Good |
| Example 11 | Good | Good | Good | Good |
| Example 12 | Good | Good | Good | Good |
| Example 13 | Good | Good | Good | Good |
| Example 14 | Good | Good | Good | Good |
| Example 15 | Good | Good | Good | Good |
| Example 16 | Good | Good | Good | Good |
| Example 17 | Good | Good | Good | Good |
| Example 18 | Good | Good | Good | Good |
| Example 19 | Good | Good | Good | Good |
| Example 20 | Good | Good | Good | Good |
| Example 21 | Good | Good | Good | Good |

TABLE 4

|  | Weldability | Strength | Toughness | SR crack resistance |
| --- | --- | --- | --- | --- |
| Comparative Example 1 | Good | Bad | Good | Bad |
| Comparative Example 2 | Bad | Good | Good | Good |
| Comparative Example 3 | Good | Bad | Good | Good |
| Comparative Example 4 | Good | Good | Bad | Good |
| Comparative Example 5 | Good | Bad | Good | Good |
| Comparative Example 6 | Good | Bad | Good | Good |
| Comparative Example 7 | Good | Bad | Good | Good |
| Comparative Example 8 | Good | Bad | Good | Good |
| Comparative Example 9 | Good | Bad | Good | Good |
| Comparative Example 10 | Good | Bad | Good | Good |
| Comparative Example 11 | Good | Good | Good | Bad |
| Comparative Example 12 | Good | Bad | Good | Good |
| Comparative Example 13 | Bad | Good | Good | Good |
| Comparative Example 14 | Bad | Good | Good | Good |
| Comparative Example 15 | Bad | Bad | Bad | Good |
| Comparative Example 16 | Good | Bad | Good | Good |
| Comparative Example 17 | Good | Good | Bad | Bad |
| Comparative Example 18 | Good | Bad | Good | Good |
| Comparative Example 19 | Goad | Good | Good | Bad |
| Comparative Example 20 | Good | Bad | Good | Good |
| Comparative Example 21 | Good | Good | Good | Bad |
| Comparative Example 22 | Good | Good | Bad | Good |

The wire of Comparative Example 1 contained too much $TiO_2$, and strength and SR crack resistance of weld metal were poor.

The wire of Comparative Example 2 contained too little $TiO_2$, and weldability was poor.

The wire of Comparative Example 3 contained too much Mn, and strength of weld metal was poor.

The wire of Comparative Example 4 contained too little Mn, a value of $28\times Mn/(390\times C+2370\times V)$ was too small, and toughness of weld metal was poor.

The wire of Comparative Example 5 contained too much Cr, and strength of weld metal was poor.

The wire of Comparative Example 6 contained too little Cr, and strength of weld metal was poor.

The wire of Comparative Example 7 contained too much Mo, and strength of weld metal was poor.

The wire of Comparative Example 8 contained too little Mo, and strength of weld metal was poor.

The wire of Comparative Example 9 contained too much Si, and strength of weld metal was poor.

The wire of Comparative Example 10 contained too little Si, and strength of weld metal was poor.

The wire of Comparative Example 11 contained too much Mg, and SR crack resistance was poor.

The wire of Comparative Example 12 contained too little Mg, and strength of weld metal was poor.

The wire of Comparative Example 13 contained too much F, and weldability was poor.

The wire of Comparative Example 14 contained too little F, and weldability was poor.

The wire of Comparative Example 15 contained too much C, a value of $28\times Mn/(390\times C+2370\times V)$ was too small, and weldability, strength of weld metal, and toughness of weld metal were poor.

The wire of Comparative Example 16 contained too little C, and strength of weld metal was poor.

The wire of Comparative Example 17 contained too much V, a value of $28\times Mn/(390\times C+2370\times V)$ was too small, and toughness and SR crack resistance of weld metal were poor.

The wire of Comparative Example 18 contained too little V, and strength of weld metal was poor.

The wire of Comparative Example 19 contained too much Nb, and SR crack resistance was poor.

The wire of Comparative Example 20 contained too little Nb, and strength of weld metal was poor.

The wire of Comparative Example 21 contained too much B, and SR crack resistance was poor.

In the wire of Comparative Example 22, a value of $28\times Mn/(390\times C+2370\times V)$ was too small, and toughness of weld metal was poor.

On the other hand, all the wires of Examples 1 to 21 were excellent in weldability, strength of weld metal, toughness of weld metal, and SR crack resistance.

The present application is based on Japanese patent application No. 2018-5013 filed on Jan. 16, 2018, the contents of which are cited as reference in the present application.

REFERENCE SIGN LIST

1 Steel plate
2 Backing metal
3 Weld metal
5 U notch
6 Slit
10 Cylindrical test piece

The invention claimed is:

1. A flux-cored wire configured for gas shielded arc welding, consisting of, based on a total wire mass:
   at least 78 mass % of Fe;
   from 4 mass % to 13 mass % of $TiO_2$;
   from 1.7 mass % to 2.4 mass % of Mn;
   from 1.1 mass % to 3.0 mass % of Cr;
   from 0.2 mass % to 1.2 mass % of Mo;

from 0.1 mass % to 0.8 mass % of Si;
from 0.1 mass % to 1.0 mass % of Mg;
from 0.05 mass % to 0.25 mass % of fluoride, based on a F conversion value;
from 0.01 mass % to 0.10 mass % of C;
from 0.003 mass % to 0.020 mass % of V;
from 0.003 mass % to 0.020 mass % of Nb; and
8 ppm or less of B,
optionally, from 0 mass % to 0.02 mass % of at least one selected from the group consisting of P, S, and N,
optionally, from 0.01 mass % to 0.20 mass % of at least one selected from the group consisting of Na and K,
with the balance being O and inevitable impurities, wherein O is derived from $SiO_2$, $Na_2O$, $K_2O$, or a combination thereof,
wherein the C is derived from a steel outer sheath of the flux-cored wire; a component contained in a flux of the flux-cored wire, the component being at least one selected from the group consisting of a graphite, chromium carbide, Si—C and an alloy of C; or both of the steel outer sheath and the component,
wherein the contents of Mn, C, and V based on the total mass of the wire satisfy a relationship of $28 \times Mn/(390 \times C + 2370 \times V) \geq 0.82$, and
wherein the contents of $TiO_2$, Mg, Nb, and V, based on the total wire mass, satisfy the following relationship:

$$0.018 \times TiO_2 \times Mg + 2 \times (Nb+V) \leq 0.09.$$

2. The wire of claim 1, wherein a content of the at least one selected from the group consisting of Na and K, based on the total wire mass, is from 0.01 mass % to 0.20 mass %.

3. The wire of claim 1, comprising from 4.5 mass % to 13 mass % of $TiO_2$.

4. The wire of claim 1, comprising from 5.0 mass % to 13 mass % of $TiO_2$.

5. The wire of claim 1, comprising from 4 mass % to 12 mass % of $TiO_2$.

6. The wire of claim 1, comprising from 4 mass % to 11 mass % of $TiO_2$.

7. The wire of claim 1, comprising from 1.7 mass % to 2.3 mass % of Mn.

* * * * *